Nov. 10, 1959 H. C. PYE 2,912,512
ANTI-SIDETONE AND LINE BALANCING TELEPHONE CIRCUIT
Filed June 19, 1956
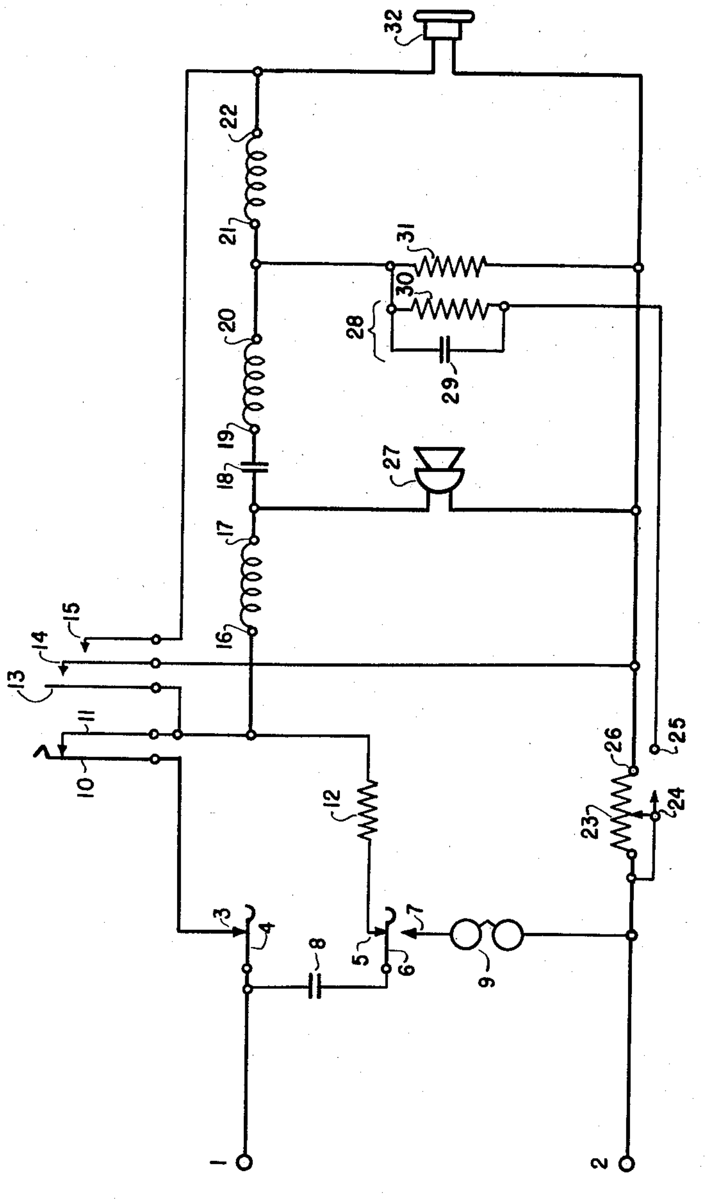
INVENTOR.
HAROLD C. PYE
BY [signature]
ATTY.

United States Patent Office 2,912,512
Patented Nov. 10, 1959

2,912,512

ANTI-SIDETONE AND LINE BALANCING TELEPHONE CIRCUIT

Harold C. Pye, Oak Park, Ill., assignor to General Telephone Laboratories, Incorporated, a corporation of Delaware Application June 19, 1956, Serial No. 592,401

5 Claims. (Cl. 179—81)

The present invention relates in general to telephone substation circuits and in particular to an improved substation circuit in which sidetone is reduced to a negligible minimum when connected to different lines having varying characteristics and impedances.

In an ideal anti-sidetone telephone substation circuit no current would be produced in the receiver of the circuit during transmission from the transmitter of the circuit and also during receiving no interfering alternating current would be produced in the receiver as a result of room noises activating the transmitter. In attempting to arrive at such results the components of the telephone substation together with the telephone line to which the station is connected are generally arranged in the form of a bridge circuit. The arms being proportioned to be balanced with respect to the alternating currents generated by the transmitter, with the receiver connected to the points of equal potential. The components of such a telephone station normally include an induction coil, a receiver, a transmitter and a line balancing network. The practically attainable characteristics of these components prevent the realization of an ideal anti-sidetone telephone.

Since the telephone line forms one arm of this bridge it is necessary that the complementary arm of the bridge act in a manner identical to it for all of the frequencies that are to be encountered if a balanced condition is to be had. This balance is comparatively easy to get for fixed or narrow bands of frequencies and for lines of particular impedance. When however the band of frequencies is increased it becomes more difficult to get a balance and this difficulty is further aggravated when the telephone is connected to lines of other impedances than that for which it was designed. Until the present invention almost all of the effort for improving anti-sidetone performance has been concentrated upon creating an anti-sidetone balancing arm that would vary its impedance so as to cause a balance for various lines and frequencies. Many complicated circuits have been developed which do provide the desired performance, but none of the researchers have attempted the scheme presented here, that is of changing the resistance of the line to present a balance with the anti-sidetone arm of the circuit. This simple expedient keeps the anti-sidetone circuit basically simple and provides the desired performance. Further this expedient has the advantage over more complicated circuits that have voltage responsive components in that it does not adversely affect the telephone performance when, as during a toll call, increased potential is applied to this line, or during a party line call where the station close to the central office will shunt the current from its more delicate components and consequently drop the voltage available to the station more remotely located on the line.

It is accordingly a general object of the present invention to provide a telephone substation circuit of the anti-sidetone and line balancing variety that is especially designed to be used with any normally encountered telephone line and which embodies facilities for substantially matching the impedance thereof with the impedance of the connected telephone line over the entire audio frequency band.

The present invention has for an object the elimination, or substantial reduction, of sidetone in a telephone receiver in subscriber sets which may be interconnected through subscriber lines, trunk and switching facilities of differing impedances.

Another object of the invention is the provision of means for decreasing interference effects on neighboring electrical circuits caused by the pulsations transmitted over the line when a dial is operated at the substation.

It is also an object to provide a telephone substation for automatic exchanges which combines satisfactory sidetone reduction with freedom from high frequency interference due to the operation of the dial pulse contactor.

An object of the invention is to make available a telephone set circuit in which sidetone is completely eliminated or eliminated to a pre-assigned degree, and in which interference with incoming voice currents arising from room or other noises picked up by the transmitter is precluded.

An object of this invention is to make available a telephone set circuit in which harmful influences causing distortions due to the saturation of the carbon granules in the transmitter are prevented.

Another object of this invention is to provide a new and improved substation circuit in which by choice of suitable constants for the circuit varied in a selective manner the sidetone level may remain low with varied line impedances.

Features of this invention relate to specific applications of these variable impedance networks, as for example their application to compensation of transmission line attenuation variations produced by different lines.

A further feature is that the set is readily adaptable for use on lines of widely varying lengths and electrical characteristics. According to this feature, a local resistor is so located in the circuit arrangement of the set that it can be included as a part of the line resistance.

In accordance with a feature of this invention, it is proposed so to arrange the components of a substation circuit of the anti-sidetone type that the impedance of the balancing network included therein can be adjusted for different lengths of line or different resistance lines between the subscriber's circuit and the exchange, the direct current supplied over the line from the exchange being utilized as a determining factor in adjusting the impedance of the balancing network.

Further features of the invention pertain to the particular arrangement of the circuit elements whereby the above objects are attained.

A feature of this invention is that station set maintenance problems are minimized because rugged elements capable of withstanding severe mechanical shock and vibration are employed.

The novel features which are believed to be characteristic of this invention are set forth with particularity in the appended claims. The invention itself, however, both as to its organization and method of operation, together with the further objects and advantages thereof, may best be understood by reference to the following description in connection with the accompanying drawings.

Referring now to the drawing. In this figure two loop conductors, 1 and 2, are shown on the left, which conductors are assumed to extend to the line connecting or switching equipment of an automatic exchange. The line switching equipment provided in the exchange for setting up connections between the various lines of the system may be of any desired impulse responsive type and, since this equipment forms no part of the present invention, it is not shown.

Bridged across conductors 1 and 2 to the left of the normally open switchhook contacts 3 and 4 are the capacitor 8, the normally closed switchhook contacts 6 and 7 and the ringer 9 arranged in series. As thus arranged, alternating current employed for ringing, when applied, will pass through this bridge and actuate the ringer, while the switchhook contacts are in the normal position.

When the handset is removed from the cradle, contacts 3, 4, 5, 6 and 7 controlled by the switchhook are placed in an off-normal position as shown. Contacts 3 and 4 close to complete a talking circuit through dial impulse contacts 10 and 11 and contact 6 breaks from contact 7 and connects to contact 5 to complete a noise suppression circuit for the dial impulse contacts 10 and 11. This noise suppression circuit employs the off-normal contacts 3 and 4, capacitor 8, off-normal contacts 5 and 6, and a non-inductive resistor 12 shunting the dial impulse contacts 10 and 11. Shunt contacts 13, 14 and 15 are employed to shunt the talking equipment at the substation, to lower the substation resistance and to prevent noise in the receiver during the pulsing period.

For transmitting, the transmitter 27 is energized by direct current from the exchange via the line conductors 1 and 2 through a circuit path which includes induction coil winding 16—17, dial pulsing contacts 10 and 11, and off-normal contacts 3 and 4, through the line loop and resistor 23. This energizing path is also part of the alternating current voice path. The other part of the alternating current voice path is comprised of capacitor 18, induction coil winding 19—20 and the sidetone balancing auxiliary resistor 31 in series, all shunting the transmitter 27, with the induction coil winding 21—22 in series with the receiver 32 shunting the sidetone balancing auxiliary resistor 31. The alternating current flowing through the transmitter due to the actuation of the transmitter divides at the junction of induction coil terminal 17 and capacitor 18. A part of this current flowing through induction coil winding 17—16, dial pulsing contacts 11 and 10 and off-normal switchhook contacts 3 and 4 and then out over the line and through resistor 23 to complete a loop to the transmitter. The other portion of this current flows through capacitor 18, induction coil winding 19—20 and through the sidetone balancing impedance 31 to complete another loop to the transmitter. A possible shunt path around the sidetone balancing impedance 31, exists in induction coil winding 21—22 and receiver 32. However when the induction coil windings 17—16 and 19—20 are properly proportioned and the sidetone balancing impedance 31 is able to present an impedance that varies with frequency in a manner similar to the line, there is established a balanced condition such that the voltage induced in winding 21—22 is equal and opposite to the voltage drop across impedance 31. Thus it is seen that there will be no current flow in the branch of winding 21—22 and receiver 25 and consequently no sidetone in the receiver 25. This zero sidetone condition is in accordance with the formula expressed by Campbell for single frequencies with lines of known impedance in United States Patent No. 1,254,475 granted July 22, 1918. In the embodiment of this invention with a line of known impedance we have a sidetone balancing impedance that maintains a balance with the line at all frequencies within the range of frequencies from 200 to 3500 cycles per second.

The circuit components are so arranged and are selected to be of values such that for very short lines the circuit described functions to present practically no sidetone in the receiver 25. When the line is of an impedance and resistance greater than what is necessary for optimum anti-sidetone performance this invention features a rheostat consisting of resistance 23 whereby the resistance of the line may in effect be decreased to again obtain the right anti-sidetone performance. The resistance of this rheostat is such that some portion of it is included for most of the lines in the average telephone exchange. When the connecting lines to the exchange are extremely long and the rheostat resistance 23 is completely shorted out by the rheostat arm 24, this arm will also switch in another anti-sidetone balancing network 28 in shunt connection with anti-sidetone balancing resistor 31. This network is comprised of a capacitor 29 shunted by a resistor 30. The line for which the auxiliary anti-sidetone network 28 is switched in is such that the increase in resistance of the line has less effect in creating an unbalance in the sidetone condition than the increasing capacitive reactance of the line. This increasing reactance on the line side of the circuit is compensated for in the anti-sidetone side of the circuit by this auxiliary network. And it is of such value that the improved anti-sidetone performance is effective for all lengths of lines that can be used in an automatic exchange area. Thus it is seen that this unique approach to balance the anti-sidetone telephone circuit by varying the line resistance arm of the circuit, while the sidetone balancing resistor remains fixed, provides a comparatively basic and consequently simple circuit which can provide exceptionally high grade performance.

This circuit also features improved pulsing due to the almost constant line resistance that is connected to the pulsing relays at the central office. This permits the pulsing relay to be adjusted for optimum performance, and eliminates the sticking of the relay armature due to saturation caused by short lines of low resistance, or if the majority of the lines in the exchange are short and the equipment is adjusted to operate effectively with short lines the remaining longer lines cannot then dial properly because the relays do not have the ability to operate in series with the greater resistance.

I have described my invention in its particulars but because of its many applications, versatility, and breadth, what I think is the scope of my invention is incorporated in the following claims.

What is claimed is:

1. The combination with a telephone set, of a rheostat and two side tone balancing impedances, the resistance of said rheostat and one of said impedances cooperating to limit the sidetone when the telephone is connected to a line having an impedance within certain limits, said rheostat operable to connect said other impedance in multiple with said one impedance, and means including said other impedance for controlling the sidetone when said telephone is connected to a line having impedance other than within certain limits.

2. A telephone substation circuit adapted to be connected with a telephone line, comprising line terminals, a handset including a transmitter and a receiver, a multiwinding induction coil, a line balancing network and a rheostat, said line balancing network comprising a resistive and a reactive component, circuit means connecting said rheostat in series with said telephone circuit and the telephone line, said line balancing network comprising a single resistor when any of the resistance of the rheostat is in the circuit, means operated simultaneously with the adjstment ouf said rheostat to zero terminal resistance to add said reactive component to said line balancing network, whereby the sidetone in said receiver is maintained below a predetermined audible level.

3. In combination in a telephone system, a telephone substation circuit connected to a line loop, said telephone substation comprising a three winding induction coil, a first anti-sidetone line balancing impedance and an auxiliary anti-sidetone line balancing impedance, a rheostat, a transmitter in series with one winding of said induction coil and said rheostat all connected across said loop, said rheostat adjustable to limit the current flow through said transmitter to a point below a predetermined value with loops of different resistances, a capacitor, the first anti-sidetone line balancing impedance in series with the second winding of said induction coil and said capacitor all connected in parallel with said transmitter, a receiver in series with the third winding of said induction coil connected in parallel with said anti-sidetone impedance, said first anti-sidetone balancing impedance connected in said substation circuit when any of the resistance of said rheostat is in series with said transmitter, means associated with said rheostat operated to connect the auxiliary anti-sidetone balancing impedance in said substation circuit when said rheostat is adjusted to zero terminal resistance.

4. A telephone set circuit comprising a transmitting circuit including a transmitter, a receiving circuit including a receiver, an anti-sidetone line balancing circuit including a two branch balancing network comprising a resistor effective for a line of a predetermined resistance, a rheostat in series with said telephone circuit and the line, said rheostat effective to increase the resistance of the line to that predetermined value at which said first branch of said balancing network is most effective, means associated with said rheostat for inserting the second branch of said balancing network when the resistance of the line exceeds the values for which the rheostat and said first branch of said balancing network are most effective, said second branch of said balancing network consisting of a capacitor and resistor in parallel, shunting said first branch.

5. In a telephone set, a transmitter, a rheostat manually operable to limit the current flow through said transmitter to a predetermined value when said telephone set is connected to a central office through conductors having insufficient resistance to limit the current flow to the predetermined value, and anti-sidetone network in said telephone set, means including said network and said rheostat for limiting the sidetone developed in the receiver to a predetermined amount when said telephone set is connected to the central office through conductors having insufficient resistance to limit the current flow to the predetermined value, another network, said rheostat manually operated to connect said other network to said telephone circuit when the telephone set is connected to the central office by means of conductors that limit the current flow through the transmitter to a value less than said predetermined value, and means including said two networks for limiting the sidetone in said receiver to a predetermined amount when said telephone set is connected to the central office by means of conductors that limit the current flow through said transmitter to a value less than said predetermined value.

References Cited in the file of this patent

UNITED STATES PATENTS

| | | |
|---|---|---|
| 1,919,314 | Wigan | July 25, 1933 |
| 2,287,998 | Johnson | June 30, 1942 |
| 2,288,049 | Tillman et al. | June 30, 1942 |
| 2,518,178 | Pye | Aug. 8, 1950 |
| 2,524,350 | Houdek | Oct. 3, 1950 |
| 2,584,830 | Bascom | Feb. 5, 1952 |